United States Patent
Stenz et al.

(10) Patent No.: US 10,416,232 B1
(45) Date of Patent: Sep. 17, 2019

(54) TIMING OPTIMIZATIONS IN CIRCUIT DESIGNS USING OPPOSITE CLOCK EDGE TRIGGERED FLIP-FLOPS

(71) Applicant: Xilinx, Inc., San Jose, CA (US)

(72) Inventors: Guenter Stenz, Niwot, CO (US); Parivallal Kannan, San Jose, CA (US)

(73) Assignee: XILINX, INC., San Jose, CA (US)

( * ) Notice: Subject to any disclaimer, the term of this patent is extended or adjusted under 35 U.S.C. 154(b) by 0 days.

(21) Appl. No.: 16/012,535

(22) Filed: Jun. 19, 2018

(51) Int. Cl.
*G01R 31/317* (2006.01)
*G01R 31/3183* (2006.01)
*H03K 19/177* (2006.01)
*G01R 31/3185* (2006.01)
*G11C 29/00* (2006.01)

(52) U.S. Cl.
CPC ............. *G01R 31/31725* (2013.01); *G01R 31/318328* (2013.01); *G01R 31/318516* (2013.01); *G01R 31/318522* (2013.01); *G11C 29/003* (2013.01); *H03K 19/17736* (2013.01)

(58) Field of Classification Search
CPC ...... G01R 31/31725; G01R 31/318516; G01R 31/318328; G01R 31/318522; G11C 29/003; H03K 19/17736
See application file for complete search history.

(56) References Cited

U.S. PATENT DOCUMENTS

| | | | |
|---|---|---|---|
| 6,167,001 A | 12/2000 | Wu | |
| 6,239,611 B1 | 5/2001 | Matera | |
| 6,734,703 B1 | 5/2004 | Alfke et al. | |
| 7,312,631 B1 | 12/2007 | Bauer et al. | |
| 7,548,089 B1 | 6/2009 | Bauer et al. | |
| 2005/0268263 A1* | 12/2005 | Sun | G06F 17/5031 716/114 |
| 2011/0095801 A1* | 4/2011 | Bjerregaard | G06F 1/10 327/270 |
| 2018/0278253 A1* | 9/2018 | Lu | H03K 5/135 |

* cited by examiner

*Primary Examiner* — Seokjin Kim
(74) *Attorney, Agent, or Firm* — Kevin T. Cuenot

(57) ABSTRACT

Implementing a circuit design may include detecting, using computer hardware, a net of the circuit design with a hold timing violation, generating, using the computer hardware, a list including each load of the net, and filtering, using the computer hardware, the list based on predetermined criteria by, at least in part, removing each load from the list determined to be non-critical with respect to hold timing. Using the computer hardware, the circuit design is modified by inserting a flip-flop in the net to drive each load remaining on the list, clocking the flip-flop with a clock signal of a start point or an end point of a path traversing the net, and triggering the flip-flop with an opposite clock edge compared to the start point or the end point.

20 Claims, 5 Drawing Sheets

TIMING OPTIMIZATIONS IN CIRCUIT DESIGNS USING OPPOSITE CLOCK EDGE TRIGGERED FLIP-FLOPS

TECHNICAL FIELD

This disclosure relates to integrated circuits (ICs) and, more particularly, to implementing circuit designs within ICs through application of timing optimizations to correct timing violations.

BACKGROUND

Implementing a circuit design within an integrated circuit (IC), whether a programmable IC or an application specific IC (ASIC), entails processing the circuit design through a design flow. The design flow includes multiple, different phases performed by an electronic design automation (EDA) system. The phases of the design flow generally include synthesis, placement, and routing.

Throughout the different stages of the design flow, the EDA system may check whether the current state of implementation of the circuit design is meeting established requirements. The EDA system, for example, may perform timing analysis on the circuit design to identify any nets included therein that are not meeting timing requirements for the circuit design.

Modern circuit designs often have aggressive timing requirements. Significant time is spent processing the circuit design through the design flow in an attempt to meet these timing requirements. In order for the circuit design to function as expected once implemented within an IC, any timing violations identified by the EDA system must be addressed.

SUMMARY

In one or more embodiments, a method includes detecting, using computer hardware, a net of the circuit design with a hold timing violation, generating, using the computer hardware, a list including each load of the net, and filtering, using the computer hardware, the list based on predetermined criteria by, at least in part, removing each load from the list determined to be non-critical with respect to hold timing. The method may include modifying, using the computer hardware, the circuit design by inserting a flip-flop in the net to drive each load remaining on the list, clocking the flip-flop with a clock signal of a start point or an end point of a path traversing the net, and triggering the flip-flop with an opposite clock edge compared to the start point or the end point.

In one or more embodiments, a system includes a memory configured to store program code and a processor coupled to the memory. The processor, in response to executing the program code, is configured to initiate operations. The operations include detecting a net of the circuit design with a hold timing violation, generating a list including each load of the net, and filtering the list based on predetermined criteria by, at least in part, removing each load from the list determined to be non-critical with respect to hold timing. The operations may also include modifying the circuit design by inserting a flip-flop in the net to drive each load remaining on the list, clocking the flip-flop with a clock signal of a start point or an end point of a path traversing the net, and triggering the flip-flop with an opposite clock edge compared to the start point or the end point.

In one or more embodiments, a computer program product includes a computer readable storage medium having program code stored thereon. The program code is executable by a processor to initiate operations. The operations can include detecting a net of the circuit design with a hold timing violation, generating a list including each load of the net, and filtering the list based on predetermined criteria by, at least in part, removing each load from the list determined to be non-critical with respect to hold timing. The operations may also include modifying the circuit design by inserting a flip-flop in the net to drive each load remaining on the list, clocking the flip-flop with a clock signal of a start point or an end point of a path traversing the net, and triggering the flip-flop with an opposite clock edge compared to the start point or the end point.

This Summary section is provided merely to introduce certain concepts and not to identify any key or essential features of the claimed subject matter. Other features of the inventive arrangements will be apparent from the accompanying drawings and from the following detailed description.

BRIEF DESCRIPTION OF THE DRAWINGS

The inventive arrangements are illustrated by way of example in the accompanying drawings. The drawings, however, should not be construed to be limiting of the inventive arrangements to only the particular implementations shown. Various aspects and advantages will become apparent upon review of the following detailed description and upon reference to the drawings.

DETAILED DESCRIPTION

Figure 1:
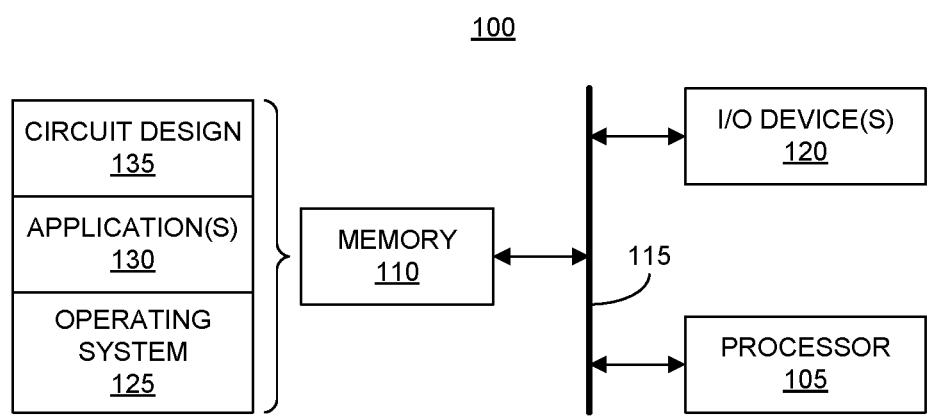
FIG. 1 illustrates an example of a data processing system for use with one or more embodiments described herein.

While the disclosure concludes with claims defining novel features, it is believed that the various features described within this disclosure will be better understood from a consideration of the description in conjunction with the drawings. The process(es), machine(s), manufacture(s) and any variations thereof described herein are provided for purposes of illustration. Specific structural and functional details described within this disclosure are not to be interpreted as limiting, but merely as a basis for the claims and as a representative basis for teaching one skilled in the art to variously employ the features described in virtually any appropriately detailed structure. Further, the terms and phrases used within this disclosure are not intended to be limiting, but rather to provide an understandable description of the features described.

This disclosure relates to integrated circuits (ICs) and, more particularly, to implementing circuit designs within ICs through application of timing optimizations to correct timing violations. In accordance with the inventive arrangements described within this disclosure, a system is capable of processing a circuit design to detect nets that have hold timing violations. In certain cases, the system is capable of modifying a net to correct a hold timing violation by inserting one or more circuit elements. The circuit elements are triggered by an opposite edge of a clock signal that launches or captures a path traversing the net.

Sequential circuit elements generally have two timing related properties referred to as setup time and hold time. For purposes of discussion within this disclosure, sequential circuit elements are presumed to be clocked. Flip-flops (FFs) are examples of sequential circuit elements. Setup time ($t_s$) is the minimum time that a signal must be stable at an input pin of a sequential circuit element before the arrival of a triggering edge of the clock signal provided to the clock pin of the sequential circuit element in order to capture the signal at the input. Hold time ($t_h$) is the minimum time that a signal must remain stable at the input pin of a sequential circuit element after the arrival of the triggering edge of the clock signal provided to the clock pin of the sequential circuit element in order to capture the signal at the input. In general, setup timing requirements ensure that signal paths ("paths") are not too long, while hold timing requirements ensure that paths are not too short.

Conventional techniques for addressing hold timing violations within circuit designs include lengthening the path with the hold timing violation. More particularly, conventional techniques attempt to fix hold timing violations during the routing phase of the design flow by adding length, e.g., wires, to those paths of the circuit design that have hold timing violations. In some cases, the Electronic Design Automation (EDA) system may also add combinatorial circuitry (e.g., logic gates) to the path. In any case, the path is effectively detoured by adding additional routing resources (e.g., wires and/or interconnects) and/or other un-clocked circuit elements to lengthen the path.

These sorts of conventional techniques are capable of slowing a path to meet a hold timing requirement. Resolving hold timing violations as described, however, often consumes a significant amount of IC resources. In many cases, routing resources of the target IC (where the "target IC" is the IC in which the circuit design is to be implemented) are scarce. Routing resources are needed to route all of the nets of the circuit design and may not be available for use in slowing a path to meet a hold timing requirement. These techniques further may cause other problems such as routing congestion. Routing congestion often causes longer runtimes for the router (e.g., the EDA system). In some cases, the router may fail to find longer paths resulting in an inability to implement the circuit design altogether.

For purposes of discussion, the term "net" refers to a portion of a circuit that has a source pin ("source") and one or more load pins ("loads"). A signal flows from the source to each of the loads. A net may include multiple paths that traverse the net. Each path, as defined herein, has a start point and an end point. Start points and end points of paths are sequential circuit elements. As such, each path starts at a clocked circuit element and ends at the next clocked circuit element. Each path may traverse, or include, one or more nets.

In accordance with the inventive arrangements described within this disclosure, the system is capable of detecting paths of a circuit design that have a hold timing violation. In particular embodiments, the hold timing violation must be sufficiently large to merit application of the timing optimization described within this disclosure. The system may also compare properties of the path with other criteria to ensure that a path with a hold timing violation qualifies for timing optimization. In cases where the path does qualify for timing optimization, the system is capable of inserting a FF within a net of the path.

The FF that is inserted into the path is triggered by an opposite edge of a clock signal compared to the start point and the end point of the path. For example, if the start point and the end point of the path are triggered by the rising edge of a clock signal, the inserted FF is clocked by the falling edge. If the start point and the end point of the path are driven by the falling edge of a clock signal, the inserted FF is clocked by the rising edge of the clock signal. The inserted FF may be clocked by the clock signal of the start point or the end point, whichever has a higher frequency.

Insertion of the FF creates two paths where one path previously existed. The first path starts at the start point of the original path and ends at the inserted FF. The second path starts at the inserted FF and ends at the end point of the original path. Prior to the optimization, a signal from the start point has approximately a full clock cycle in time to propagate to the end point. Subsequent to the optimization, a signal from the start point has approximately one-half of a clock cycle to propagate from the start point to the inserted FF and approximately one-half of a clock cycle to propagate from the inserted FF to the end point. This optimization is capable of resolving hold timing violations when performed as described in greater detail below.

Further aspects of the inventive arrangements are described below in greater detail with reference to the figures. For purposes of simplicity and clarity of illustration, elements shown in the figures have not necessarily been drawn to scale. For example, the dimensions of some of the elements may be exaggerated relative to other elements for clarity. Further, where considered appropriate, reference numbers are repeated among the figures to indicate corresponding, analogous, or like features.

FIG. 1 illustrates an example system 100 for use with one or more embodiments described herein. System 100 is an example of computer hardware that may be used to implement a computer, a server, a portable computer such as a laptop or a tablet computer, or other data processing system. A system or device implemented using computer hardware is capable of performing the various operations described herein relating to processing a circuit design for implementation as hardware within an IC.

In the example of FIG. 1, system 100 includes at least one processor 105. Processor 105 is coupled to memory 110 through interface circuitry 115. System 100 is capable of storing computer readable instructions (also referred to as "program code") within memory 110. Memory 110 is an example of computer readable storage media. Processor 105 is capable of executing the program code accessed from memory 110 via interface circuitry 115.

Memory 110 may include one or more physical memory devices such as, for example, a local memory and a bulk storage device. Local memory refers to non-persistent memory device(s) generally used during actual execution of program code. Examples of local memory include random access memory (RAM) and/or any of the various types of RAM that are suitable for use by a processor during execution of program code (e.g., dynamic RAM or "DRAM" or static RAM or "SRAM"). A bulk storage device refers to a persistent data storage device. Examples of bulk storage devices include, but are not limited to, a hard disk drive (HDD), a solid-state drive (SSD), flash memory, a read-only memory (ROM), an erasable programmable read-only memory (EPROM), electrically erasable programmable read-only memory (EEPROM), or other suitable memory. System 100 may also include one or more cache memories (not shown) that provide temporary storage of at least some program code to reduce the number of times program code must be retrieved from a bulk storage device during execution.

Memory 110 is capable of storing program code and/or data. For purposes of illustration, memory 110 stores an operating system 125, one or more application(s) 130, and a circuit design 135. In one or more embodiments, application(s) 130 include an EDA application. The EDA application is capable of performing one or more operations of a design flow (e.g., synthesis, placement, routing, and/or bitstream generation) and the various operations described herein relating to implementing timing optimizations on circuit design 135 to correct hold timing violations. System 100 further is capable of implementing circuit design 135 within a target IC. The target IC may have an architecture the same as or similar to the architecture described herein in connection with FIG. 7.

System 100, e.g., processor 105, is capable of executing operating system 125 and application(s) 130 to perform the operations described within this disclosure. As such, operating system 125 and application(s) 130 may be considered an integrated part of system 100. Further, it should be appreciated that any data used, generated, and/or operated upon by system 100 (e.g., processor 105) are functional data structures that impart functionality when employed as part of the system.

Examples of interface circuitry 115 include, but are not limited to, a system bus and an input/output (I/O) bus. Interface circuitry 115 may be implemented using any of a variety of bus architectures. Examples of bus architectures may include, but are not limited to, Enhanced Industry Standard Architecture (EISA) bus, Accelerated Graphics Port (AGP), Video Electronics Standards Association (VESA) local bus, Universal Serial Bus (USB), and Peripheral Component Interconnect Express (PCIe) bus.

System 100 further may include one or more I/O devices 120 coupled to interface circuitry 115. I/O devices 120 may be coupled to system 100, e.g., interface circuitry 115, either directly or through intervening I/O controllers. Examples of I/O devices 120 include, but are not limited to, a keyboard, a display device, a pointing device, one or more communication ports, and a network adapter. A network adapter refers to circuitry that enables system 100 to become coupled to other systems, computer systems, remote printers, and/or remote storage devices through intervening private or public networks. Modems, cable modems, Ethernet cards, and wireless transceivers are examples of different types of network adapters that may be used with system 100.

System 100 may include fewer components than shown or additional components not illustrated in FIG. 1 depending upon the particular type of device and/or system that is implemented. In addition, the particular operating system, application(s), and/or I/O devices included may vary based upon system type. Further, one or more of the illustrative components may be incorporated into, or otherwise form a portion of, another component. For example, a processor may include at least some memory. System 100 may be used to implement a single computer or a plurality of networked or interconnected computers each implemented using the architecture of FIG. 1 or an architecture similar thereto.

System 100 is capable of modifying circuit design 135 by performing one or more timing optimizations on selected nets of circuit design 135. System 100 is capable of addressing or correcting hold timing violations detected within circuit design 135. In one or more embodiments, the optimizations described may be performed subsequent to synthesis of circuit design 135. In particular embodiments, the optimizations may be performed subsequent to placement of circuit design 135. By applying the various techniques described herein, system 100 is capable of modifying circuit design 135 to remove hold timing violations and doing so without unnecessarily increasing wirelength in circuit design 135.

The inventive arrangements described within this disclosure are also capable of providing improved operation of the implementation tools, e.g., system 100 itself. System 100, for example, is capable of performing the operations necessary for implementation of circuit design 135, e.g., routing, which is part of a design flow, in less time than would otherwise be the case had the operations described herein not been performed. Thus, the inventive arrangements support faster execution and operation of system 100 while performing various stages of the design flow. In some cases, system 100 is able to successfully route circuit design 135 where other conventional approaches typically fail.

Figure 2:
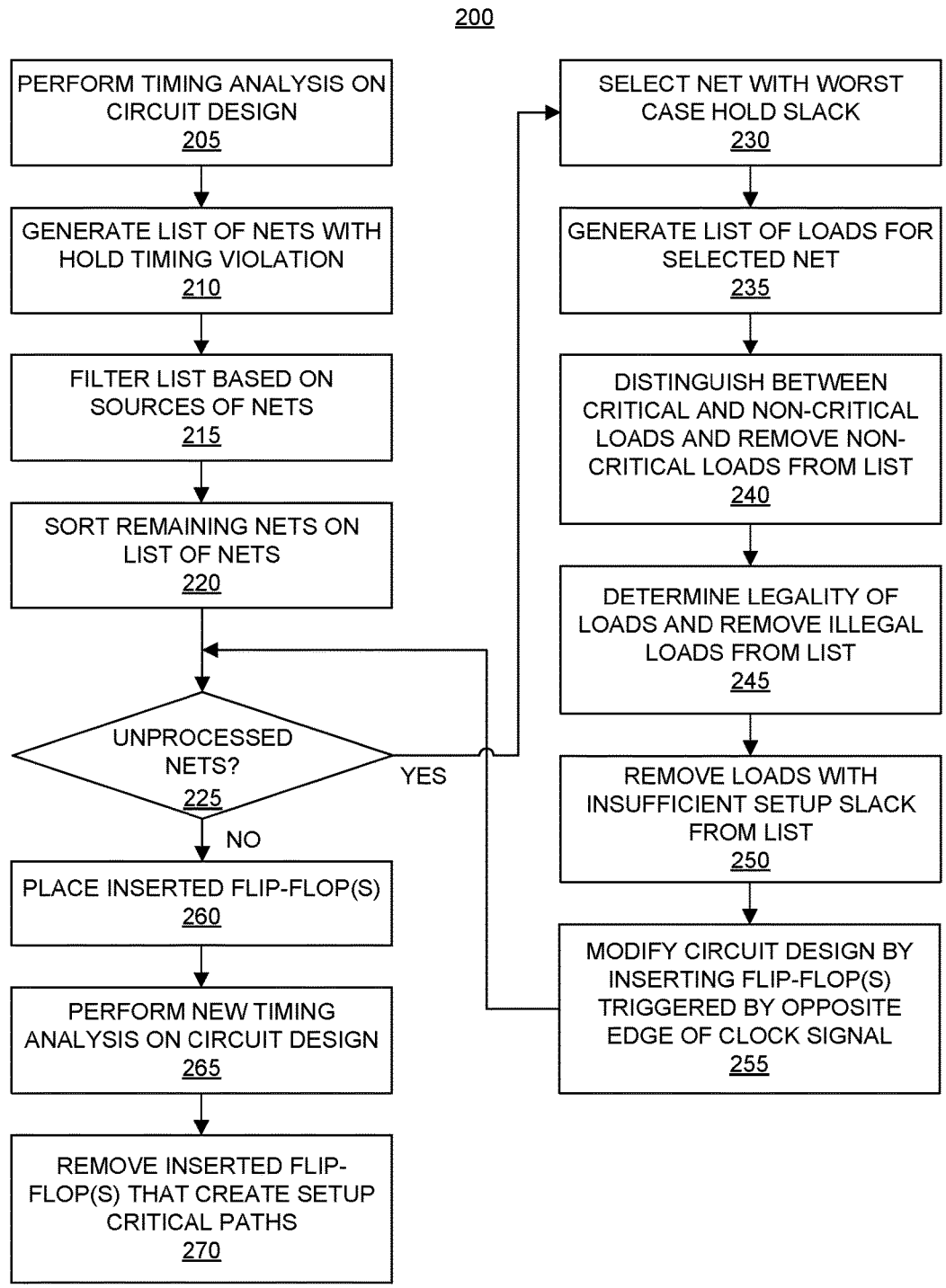
FIG. 2 illustrates an example method of performing timing optimization for nets of circuit designs having hold timing violations.

FIG. 2 illustrates an example method 200 of performing timing optimization for nets of circuit designs having hold timing violations. Method 200 may be performed by a system the same as, or similar to, the system described in connection with FIG. 1. Method 200 may begin in a state where a circuit design has been loaded into the system for processing.

In block 205, the system is capable of performing a timing analysis on the circuit design. The system is capable of performing a static timing analysis on the circuit design to determine a setup slack and a hold slack for each pin of the circuit design. In block 210, the system is capable of generating a list of the nets of the circuit design that have a hold timing violation. For nets traversed by more than one path, the worst-case hold timing violation (e.g., worst-case hold slack) for any path traversing the net is attributed to the net. The system is capable of generating a list of each net that has a negative hold slack. A negative hold slack indicates that the net has a hold timing violation.

In block 215, the system is capable of filtering the list of nets generated in block 210 based upon the source of each net. For a net to be considered a candidate for the timing optimization(s) described herein, in addition to having a hold timing violation, the net must have a source that is a sequential circuit element. The system is capable of removing each net from the list that has a source that is not a sequential circuit element. Examples of sequential circuit elements include, but are not limited to, FFs and block RAMs. Since each net on the list has a source that is a sequential element, the source of the net is also a start point of any path traversing that net.

In block 220, the system is capable of sorting the nets on the list. The system is capable of sorting the nets on the list based on hold slack. For example, the system may sort the nets from the worst (most negative) hold slack to the best (least negative) hold slack. In block 225, the system determines whether there are any unprocessed nets on the list generated in block 210. If so, method 200 continues to block 230. If not, method 200 proceeds to block 260.

In block 230, the system is capable of selecting the net with the worst-case hold slack (e.g., the most negative hold slack) which corresponds to the net with the worst hold timing violation. By sorting the nets based on hold slack and selecting the net with the worst-case hold slack, the system is effectively selecting the most critical of the nets with regard to hold timing violations. Since the nets are sorted according to hold slack in block 220, the system may process the nets in order.

In block 235, the system is capable of generating a list of the loads of the selected net. In blocks 240-250, the system is capable of filtering the list of loads based on predetermined criteria. For example, the system is capable of comparing each of the loads on the list with the predetermined conditions and, in response to determining that a load does not meet the predetermined conditions, remove the load from the list.

In block 240, the system is capable of distinguishing between critical and non-critical loads on the list generated in block 235. The predetermined criteria for removing a load from the list may specify that only critical loads may remain on the list. As such, the system may remove from the list any loads deemed non-critical.

Within this disclosure, a critical load refers to a load pin that has a hold slack that is more negative than a hold slack threshold. In one or more embodiments, the hold slack threshold may be zero so that any hold slack that is negative indicates a critical load. In particular embodiments, the hold slack threshold may be a negative value thereby ensuring that critical loads are those with a hold timing violation of at least a particular magnitude. For example, the system may determine that only loads with a negative hold slack worse than −300 picoseconds (e.g., having a negative hold slack with an absolute value exceeding 300 picoseconds) is considered critical.

In cases where the net has a single load, the system determines whether that load is critical. In cases where the net has more than one load, the net may have one or more loads that are critical and zero or more loads that are non-critical. The system is capable of removing each non-critical load from the list. In evaluating criticality of a load that is not a sequential circuit element, the system is capable of attributing the hold slack of a sequential element in the output cone of that load to the load itself.

In block 245, the system is capable of determining the legality of the loads remaining on the list. A "legal" load is one that meets particular conditions so that the timing optimization operations described herein may be performed without adding latency to the net. The system removes from the list those loads that are determined to be "illegal". In general, when a load is a sequential circuit element, the system is capable of determining whether the load is legal based upon direct application of the conditions to the load.

When the load is not a sequential circuit element, the system may determine whether the load is legal based upon application of the conditions to any sequential circuit elements in an output cone of the load. In cases where the load is not a sequential circuit element, the system is capable of traversing the output cone of the load until all down-stream end points of paths (e.g., sequential circuit elements) are reached from the load and evaluating such down-stream end points.

In one or more embodiments, the system is capable of removing each load from the list that is not triggered by a same clock edge (e.g., rising or falling) as the source of the net (e.g., the start point of a path) or that has an output cone including a sequential circuit element that is not triggered by the same clock edge as the source of the net. For example, in the case where the load is a sequential circuit element, the system removes any load from the list that is not triggered by a same clock edge as the source of the net. For any load that is not a sequential circuit element, the system removes the load from the list if any sequential circuit element in the output cone of the load is not triggered by the same clock edge as the source of the net. In other words, if a path end point is reached from the load and the path end is clocked by a different clock edge than the source of the selected net, the system removes the load from the list.

The system is also capable of removing any load from the list that is determined to be asynchronous with the source of the net. Clock signals are synchronous when each clock signal is provided, or derived, from a same parent clock. The system is capable of removing each load from the list that is a sequential circuit element that is clocked by a clock signal that is asynchronous to the source of the net. Such loads are said to be asynchronous with the source of the net. The system is also capable of removing any load from the list that is not a sequential circuit element and that has an output cone including a sequential circuit element with a clock signal that is asynchronous to the source of the net. Such loads are also said to be asynchronous to the source of the net.

The system is capable of removing each load from the list when neither (1) the period of the clock associated with the load (load period) is a multiple of the period of the clock of the source (source period); nor (2) the source period is a multiple of the load period. In other words, the system does not remove a load from the list when either the load period is multiple of the source period or the source period is a multiple of the load period. The comparison of clock period may be performed for source-to-load pairings. As such, the periods of different loads need not be integer multiples of one another. As an illustrative and nonlimiting example, for a given source-load pair, when the source period is 2 and the load period is 4, the system does not remove the load from the list. When the source period is 4 and the load period is 2, the system does not remove the load from the list. When the source period is 2 and the load period is 3, the system removes the load from the list. Within this disclosure, a clock signal may be said to be associated with a load if the clock signal drives the load or drives a sequential circuit element in an output cone of a load that is not a sequential circuit element.

The system is also capable of checking that the clock signal of each load on the list that is a sequential circuit element and the clock signal of any sequential circuit element in an output cone of a non-sequential circuit element load on the list does not have a phase shift relative to the clock signal of the source. The system removes any load from the list that is associated with a clock signal, as described, with a phase shift or phase difference relative to the clock signal of the source of the net.

In block 250, the system is capable of removing any loads from the list that have insufficient setup slack. The system, for example, may compare the setup slack of loads remaining on the list with a threshold setup slack. In one or more embodiments, the threshold setup slack is positive and half of the period of the clock signal of any newly inserted FF. Any newly inserted FF will be clocked by the clock signal of the source or the clock signal of the capturing sequential circuit element (e.g., the clock signal of the end point of the path into which the FF is inserted), whichever has the higher frequency. As such, the system is capable of removing each end point from the list that does not have a setup slack that is positive and exceeds half the period of the clock signal used to clock the FF (or another threshold) that will/may be inserted.

In other words, the clock input of any newly inserted FF will be connected to either the clock net of the launching sequential circuit element or the clock net of the capturing sequential circuit element depending on which of the clock nets has the higher frequency. If the capturing clock net has a higher frequency, the system may also check that all loads are associated with the same clock net to avoid creating new clock domain crossings.

In block 255, the system is capable of modifying the circuit design by inserting one or more FFs into the net to drive the loads that remain on the list. The system connects each inserted FF to the clock signal with the higher frequency between the source of the net and the capturing sequential circuit element of the path into which the FF is inserted. Whereas the source and end points of paths traversing the net are triggered by a particular edge of the clock signal, the inserted FF is triggered by the opposite clock edge. In inserting the FF(s), the system is capable of connecting the critical loads to the newly inserted FF(s). Any of the loads of the net that were removed from the list prior to block 255 remain driven by the source of the net.

In block 260, the system is capable of placing the newly inserted FF(s). In one or more embodiments, the system is capable of using a center of gravity approach to placing each of the inserted FFs. For example, the system determines the location of each circuit element that drives a newly inserted FF and the location of each load that is driven by the newly inserted FF. The system is capable of determining a geographic center of these locations and selecting a location or available site of the target IC for placing each newly inserted FF that is within a predetermined distance of the geographic center. The system, for example, may traverse a path that spirals outward from the geographic center for each net until a suitable location for the FF is found and then place the FF at such location.

In block 265, the system is capable of performing a new timing analysis. The system, for example, performs a new static timing analysis to determine updated setup slacks and updated hold slacks for the circuit design or at least for the paths that had hold timing violations. In general, the setup slack for the selected net will worsen, while the hold slack improves.

In block 270, the system is capable of removing any FFs inserted in block 255 that create setup critical paths. For example, the system is capable of analyzing the setup slack for the loads (end points) driven by each inserted FF. The system is capable of determining whether to keep or remove each of the inserted FFs on an individual basis based on whether the insertion of the FF degraded the setup slack of the path within which the FF was inserted beyond a threshold setup slack.

For example, the system is capable of comparing the setup slacks of loads of any modified paths with a threshold setup slack. In one or more embodiments, the threshold setup slack used is zero. Accordingly, in response to determining that the setup slack of a load of a modified path is greater than or equal to zero, the system keeps the inserted FF within the path. In response to determining that the setup slack of a load of a modified path is less than zero (e.g., is negative), the system removes the inserted FF from the path.

Figure 3:
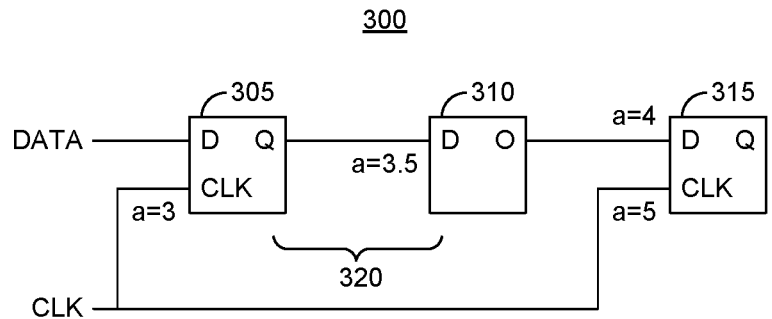
FIG. 3 illustrates an example of a circuit with a hold timing violation.

FIG. 3 illustrates an example of a circuit 300 with a hold timing violation. Circuit 300 includes a net 320 formed of FF 305 and a lookup table (LUT) 310 and another net formed of LUT 310 and FF 315. Within this disclosure, particular pins (e.g., inputs and/or outputs) of circuit components may be referred to using the name and reference number of the circuit component followed by the pin label separated with an underscore ("_"). For example, the D input of FF 305 may be referred to as FF305_D. For purposes of illustration, FFs 305 and 315 are triggered on the rising edge of the clock signal.

Further, the system has performed a static timing analysis on circuit 300. The system determines that the net 320 has a hold timing violation (e.g., is hold-critical) based upon the hold slack of FF315_D, which is attributed to FF305_Q and/or to LUT 310 (the load of net 320). In this example, net 320 is the selected net. Within this disclosure, signal arrival times at various pins of FF 305, FF 315, and LUT 310 are denoted using the variable "a" Required times of signals may be denoted using the variable "r".

In the example of FIG. 3, FF 305 is the source of net 320 and is also the start point of the path that traverses net 320 and the following net ending at FF 315, which is an end point of the path. The data (DATA) signal enters FF305_D. At time a=3, a rising edge of the clock signal arrives at the FF305_CLK, which starts the timing of the path. At time a=3.5, the signal output from FF305_Q arrives at LUT310_D. At time a=4, the signal output from LUT310_O arrives at FF315_D. At time a=5, the rising clock edge that started the timing path at FF 305 reaches FF315_CLK, where the signal is captured with the next rising clock edge following a=5. The timing path shown in circuit 300 is launched with a rising clock edge at FF 305. The signal is captured in FF 315 at time a(FF315_CLK)+T, where T represents the clock period.

The system is capable of performing a setup analysis and a hold analysis on circuit 300. For setup analysis, the arrival time of the data signal at FF315_D is compared with the arrival time of the next following capturing clock edge at time a(FF315_CLK)+T. Given setup time is for FF 315, the arrival time of the data signal at FF315_D, denoted as a(FF315_D), must be at most a(FF315_CLK)+T−$t_s$ to meet the setup timing requirement of FF 315. As such, the time a(FF315_CLK)+T−$t_s$ is referred to as the required setup time of FF315_D and may be denoted as r(FF315_D). With this in mind, the setup timing requirement of a(FF315_D)<=r(FF315_D) may be defined. The setup slack at a pin "p," denoted as s_slack(p), may be defined as s_slack(p)=r(p)−a(p). The setup condition is met if s_slack(p)>=0.

For hold analysis, the arrival time of the data signal at FF315_D is compared with the arrival time of the previous capturing clock edge at time a(FF315_CLK). Given the hold time $t_h$ for FF 315, the arrival time of the data signal at FF315_D, denoted as a(FF315_D), must be at least a(FF315_CLK)+$t_h$ to meet the hold timing requirement of FF 315. As such, the time a(FF315_CLK)+$t_h$ is referred to as the required hold time and may be denoted as $r_h$(FF315_CLK). Accordingly, the hold timing requirement of a(FF315_D)>=$r_h$(FF315_D) may be defined. The hold slack at a pin "p," denoted as h_slack(p), may be defined as h_slack(p)=a(p)−rh(p). The hold condition is met if h_slack(p)>=0.

Referring again to the example of FIG. 3, consider the case where T=2 and $t_h$=$t_s$=0. In that case, the setup timing requirement a(FF315_D)=4≤r(FF315_D)=7 is met. The hold timing requirement a(FF315_D)=4≥rh(FF315_D)=5 is violated indicating a hold timing violation. The setup slack s_slack(FF315_D)=3, while the hold slack h_slack(FF315_D)=−1.

Figure 4:
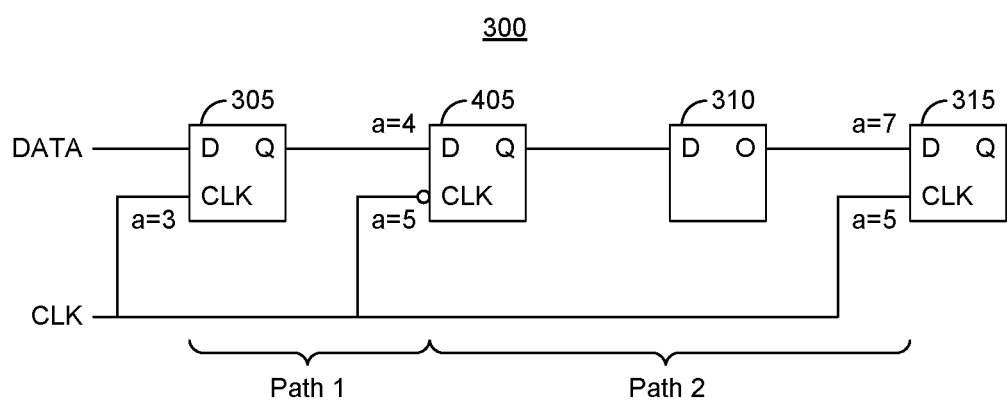
FIG. 4 illustrates the circuit of FIG. 3 after application of a timing optimization.

FIG. 4 illustrates circuit 300 of FIG. 3 after application of a timing optimization. The timing optimization is applied by the system, using the technique illustrated in FIG. 2, to remove the hold timing violation. In the example of FIG. 4, the system has identified net 320 as the selected net with a hold timing violation. Further, the system has determined that legality requirements are met since FFs 305 and 315 are triggered by the same clock signal and with the same edge of that clock signal. The system determines that LUT 310, e.g., the load of net 320, meets the requirements for timing optimization based on applying the conditions described herein to FF 315, which is in the output cone of LUT 310.

In the example of FIG. 4, the system has inserted FF 405 within net 320 between FF 305 and LUT 310. FF 405 is said to be inserted into the path of FF 315. FF 405 is triggered on a clock edge that is the opposite of the clock edge used to trigger FF 305 (the source of net 320 and start point of the path) and FF 315 (the end point of the path). For example, if FFs 305 and 315 are triggered on the rising (falling) edge of the clock signal, FF 405 is triggered on the falling (rising) edge of the clock signal.

Insertion of FF 405 into net 320 does not change the functionality of circuit 300 or add latency to circuit 300. For example, a rising clock edge received at FF305_CLK launches a timing for the path shown in FIG. 4. The signal generated by FF305_Q is captured at FF405_D in response to FF405_CLK receiving the following falling clock edge of the clock signal, traverses LUT 310, and is captured in FF 315 in response to FF315_CLK receiving the following rising edge of the clock signal. This is analogous to the original behaviour of circuit 300 of FIG. 3.

In the example of FIG. 4, the times at which FFs 305 and 315 capture data have not changed. The creation of FF 405 has resulted in two paths effectively splitting the original path from FF 305 to FF 315 into two separate paths. Path 1 is from FF 305 to FF 405. Path 2 is from FF 405 to FF 315. For each of paths 1 and 2 there is only half a clock period (e.g., T/2) available. The reduced clock period for each path makes the setup times more difficult to meet while hold times are improved. As such, the system is able to utilize the technique illustrated in FIG. 2 in cases where a sufficient amount of positive setup slack and a sufficiently large negative hold slack exists.

In the example of FIG. 4, path 1 is launched with the rising edge of the clock signal at a(FF305_CLK)=3 and reaches FF405_D at a=4. The falling (capturing) clock edge arrives at FF405_CLK at time a(FF405_CLK)+T/2=5+1=6, which means that r(FF405_D)=6. Setup slack s_slack (FF405_D)=+2. As such, the system determines that setup timing requirement is met though the setup slack is smaller than was the case in FIG. 3 since path 1 has only half of the clock period available. Hold analysis is done with respect to the previous falling edge at time a(FF405_CLK)−T/2=5−1=4, which means $r_h$(FF405_CLK)=4 and the hold timing requirement is met as well. FIG. 4 illustrates that inserting FF 405 helps with hold timing violations since hold timing is checked with respect to a clock edge at time a=4 rather than at time a=5 as was the case in FIG. 3.

Path 2 is launched with the falling edge at time a(FF405_CLK)+T/2=6 and reaches FF315_D by time a=7. The data signal is captured at FF315_D by a rising clock edge at time a(FF315_CLK)+T=7. As such, r(FF315_D)=7 and the system determines that the setup timing requirement is met with s_slack(FF315_D)=0. The system is capable of checking hold slack at FF 315 with respect to the previous rising clock edge at time a(FF315_CLK)=5. This means that $r_h$(FF315_D)=5 and the hold timing requirement is met with a hold slack of h_slack(FF315_D)=+2. FIG. 4 illustrates that inserting FF 405 helps with hold timing violations since hold timing at FF 315 is checked with respect to a clock edge at time a=5, which is before the path launch time at time 6.

Figure 5:
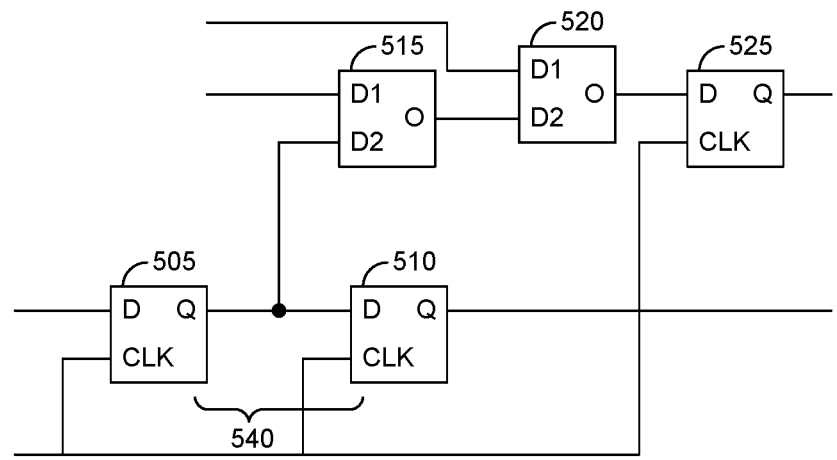
FIG. 5 illustrates an example of a circuit with a hold timing violation and a plurality of loads.

FIG. 5 illustrates an example of a circuit 500 with a hold timing violation and a plurality of loads. As pictured, circuit 500 includes FFs 505, 510, and 525 and LUTs 515 and 520. FF 505 is the source of net 540, while FF 510 and LUT 515 are loads. The signal of net 540 is captured in FFs 510 and 525. In the example of FIG. 5, FF 525 is located farther away from FF 505 than is FF 510. The data signal output from FF 505 must traverse multiple logic levels to reach FF 525. For purposes of discussion, FF 525 meets the setup timing requirement and the hold timing requirement. FF 510, being located relatively close to FF 505, meets the setup timing requirement, but not the hold timing requirement.

In the example of FIG. 5, the system is capable of implementing the operations described in connection with FIG. 2 to select net 540 for processing. Further, the system has determined that FF 510 is hold-critical, while FF 525 is not. The system also has determined that the clock signal of FF 510 is the same as or is derived from (e.g., is synchronous with) the clock signal of FF 505. Both FFs 505 and 510 are triggered by the same edge of the clock signal (e.g., the rising edge for purposes of discussion). The system determines that FF 510 meets the requirements for timing optimization.

Figure 6:
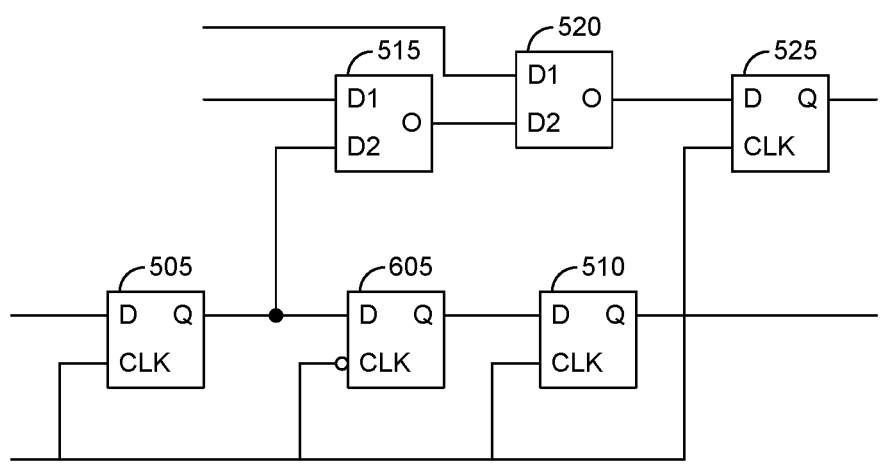
FIG. 6 illustrates the circuit of FIG. 5 after application of a timing optimization.

FIG. 6 illustrates circuit 500 of FIG. 5 after application of the timing optimization described in connection with FIG. 2. In the example of FIG. 6, the system has inserted FF 605 into the path including FF 510. The system connects FF605_D to FF505_Q. LUT 515 remains driven by FF505_Q. The system connects FF510_D to FF605_Q. As pictured, FF 605 is triggered by the opposite clock edge (e.g., the falling clock edge) than FF 505 and FF 510. The modification to circuit 500 as performed by the system is kept so long as introduction of FF 605 into the path corresponding to FF 510 does not result in a setup timing violation.

In one or more other embodiments, the system is capable of inserting more than one additional FF. For example, consider a net having 100 loads that are considered critical (e.g., have hold timing violations). In the case where the legality check reveals that a first subset of the 100 loads is driven by clock A, while a second subset of the 100 loads is driven by clock B, the system may insert a FF triggered on the opposing clock edge as described for each subset of the 100 loads. Thus, rather than inserting one FF to drive each of the 100 critical loads, the system inserts a first FF clocked by an opposite edge of clock A to drive each load of the first subset of loads and inserts a second FF clocked by an opposite edge of clock B to drive each load of the second subset of loads. In this example, clock A and clock B may have different frequencies, but still are derived from the clock signal provided to the source of the net (e.g., clock A and clock B are synchronous with the clock of the source of the net).

In one or more embodiments, the techniques described herein may be applied between place and route within a design flow. In evaluating the success of the timing optimizations performed, a metric called "total hold slack" or "THS" may be defined as the sum of negative hold slacks summed over all path end points. In applying the timing optimizations described within this disclosure, THS of circuit designs may be reduced over 15%. When THS sums negative hold slacks that exceed a threshold such as −300 picoseconds, THS may be reduced by over 70% and, in some cases, reduced to zero.

By applying the timing optimizations described herein, the speed of routing the circuit design (e.g., performing router expansion) may be reduced significantly thereby reducing runtime of the system. As an illustrative and nonlimiting example, a reduction of THS of 40% in a circuit design translates into a reduction in router runtime for the circuit design of over 15%. This is particularly true for circuit designs with longer router runtimes.

Figure 7:
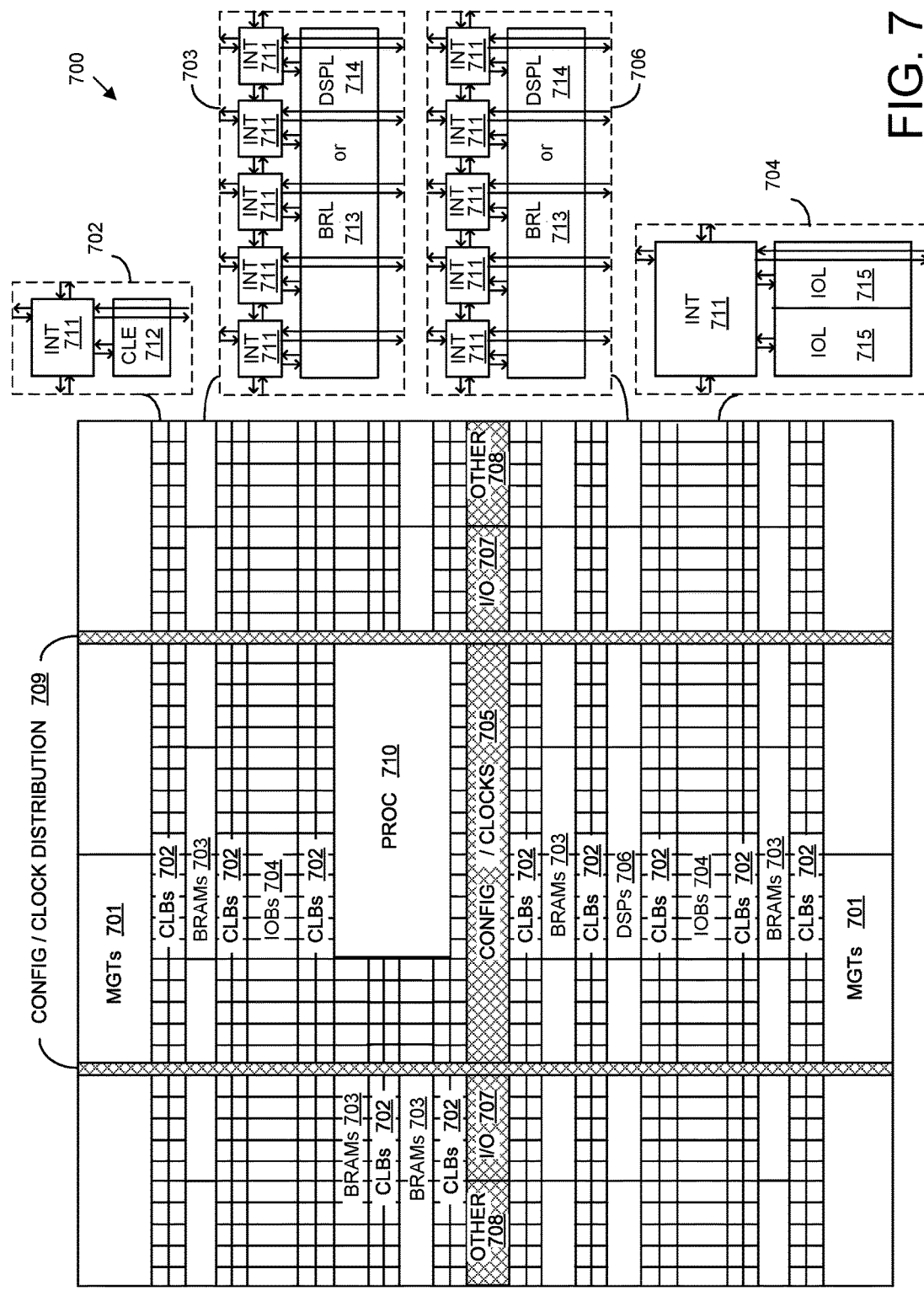
FIG. 7 illustrates an example architecture for an integrated circuit (IC).

FIG. 7 illustrates an example architecture 700 for an IC. In one aspect, architecture 700 may be implemented within a programmable IC. For example, architecture 700 may be used to implement a field programmable gate array (FPGA). Architecture 700 may also be representative of a system-on-chip (SOC) type of IC. An SOC is an IC that includes a processor that executes program code and one or more other circuits. The other circuits may be implemented as hardwired circuitry, programmable circuitry, and/or a combination thereof. The circuits may operate cooperatively with one another and/or with the processor.

As shown, architecture 700 includes several different types of programmable circuit, e.g., logic, blocks. For example, architecture 700 may include a large number of different programmable tiles including multi-gigabit transceivers (MGTs) 701, configurable logic blocks (CLBs) 702, random access memory blocks (BRAMs) 703 (also referred to as block RAMs), input/output blocks (IOBs) 704, configuration and clocking logic (CONFIG/CLOCKS) 705, digital signal processing blocks (DSPs) 706, specialized I/O blocks 707 (e.g., configuration ports and clock ports), and other programmable logic 708 such as digital clock managers, analog-to-digital converters, system monitoring logic, and so forth.

In some ICs, each programmable tile includes a programmable interconnect element (INT) 711 having standardized connections to and from a corresponding INT 711 in each adjacent tile. Therefore, INTs 711, taken together, implement the programmable interconnect structure for the illustrated IC. Each INT 711 also includes the connections to and from the programmable logic element within the same tile, as shown by the examples included at the top of FIG. 7.

For example, a CLB 702 may include a configurable logic element (CLE) 712 that may be programmed to implement user logic plus a single INT 711. CLBs 702 may include FFs and LUTs. A BRAM 703 may include a BRAM logic element (BRL) 713 in addition to one or more INTs 711. Typically, the number of INTs 711 included in a tile depends on the height of the tile. As pictured, a BRAM tile has the same height as five CLBs, but other numbers (e.g., four) also may be used. A DSP tile 706 may include a DSP logic element (DSPL) 714 in addition to an appropriate number of INTs 711. An 10B 704 may include, for example, two instances of an I/O logic element (IOL) 715 in addition to one instance of an INT 711. The actual I/O pads connected to IOL 715 may not be confined to the area of IOL 715.

In the example pictured in FIG. 7, a columnar area near the center of the die, e.g., formed of regions 705, 707, and 708, may be used for configuration, clock, and other control logic. Horizontal areas 709 extending from this column may be used to distribute the clocks and configuration signals across the breadth of the programmable IC.

Some ICs utilizing the architecture illustrated in FIG. 7 include additional logic blocks that disrupt the regular columnar structure making up a large part of the IC. The additional logic blocks may be programmable blocks and/or dedicated circuitry. For example, a processor block depicted as PROC 710 spans several columns of CLBs and BRAMs.

In one aspect, PROC 710 may be implemented as dedicated circuitry, e.g., as a hardwired processor, that is fabricated as part of the die that implements the programmable circuitry of the IC. PROC 710 may represent any of a variety of different processor types and/or systems ranging in complexity from an individual processor, e.g., a single core capable of executing program code, to an entire processor system having one or more cores, modules, co-processors, interfaces, or the like.

In another aspect, PROC 710 may be omitted from architecture 700 and replaced with one or more of the other varieties of the programmable blocks described. Further, such blocks may be utilized to form a "soft processor" in that the various blocks of programmable circuitry may be used to form a processor that can execute program code as is the case with PROC 710.

The phrase "programmable circuitry" refers to programmable circuit elements within an IC, e.g., the various programmable or configurable circuit blocks or tiles described herein, as well as the interconnect circuitry that selectively couples the various circuit blocks, tiles, and/or elements according to configuration data that is loaded into the IC. For example, circuit blocks shown in FIG. 7 that are external to PROC 710 such as CLBs 702 and BRAMs 703 are considered programmable circuitry of the IC.

In general, the functionality of programmable circuitry is not established until configuration data is loaded into the IC. A set of configuration bits may be used to program programmable circuitry of an IC such as an FPGA. The configuration bit(s) typically are referred to as a "configuration bitstream." In general, programmable circuitry is not operational or functional without first loading a configuration bitstream into the IC. The configuration bitstream effectively implements a particular circuit design within the programmable circuitry. The circuit design specifies, for example, functional aspects of the programmable circuit blocks and physical connectivity among the various programmable circuit blocks.

Circuitry that is "hardwired" or "hardened," i.e., not programmable, is manufactured as part of the IC. Unlike programmable circuitry, hardwired circuitry or circuit blocks are not implemented after the manufacture of the IC through the loading of a configuration bitstream. Hardwired circuitry is generally considered to have dedicated circuit blocks and interconnects, for example, that are functional without first loading a configuration bitstream into the IC, e.g., PROC 710.

In some instances, hardwired circuitry may have one or more operational modes that can be set or selected according to register settings or values stored in one or more memory elements within the IC. The operational modes may be set, for example, through the loading of a configuration bitstream into the IC. Despite this ability, hardwired circuitry is not considered programmable circuitry as the hardwired circuitry is operable and has a particular function when manufactured as part of the IC.

In the case of an SOC, the configuration bitstream may specify the circuitry that is to be implemented within the programmable circuitry and the program code that is to be executed by PROC 710 or a soft processor. In some cases, architecture 700 includes a dedicated configuration processor that loads the configuration bitstream to the appropriate configuration memory and/or processor memory. The dedicated configuration processor does not execute user-specified program code. In other cases, architecture 700 may utilize PROC 710 to receive the configuration bitstream, load the configuration bitstream into appropriate configuration memory, and/or extract program code for execution.

FIG. 7 is intended to illustrate an example architecture that may be used to implement an IC that includes programmable circuitry, e.g., a programmable fabric. For example, the number of logic blocks in a column, the relative width of the columns, the number and order of columns, the types of logic blocks included in the columns, the relative sizes of the logic blocks, and the interconnect/logic implementations included at the top of FIG. 7 are purely illustrative. In an actual IC, for example, more than one adjacent column of CLBs is typically included wherever the CLBs appear, to facilitate the efficient implementation of a user circuit design. The number of adjacent CLB columns, however, may vary with the overall size of the IC. Further, the size and/or positioning of blocks such as PROC 710 within the IC are for purposes of illustration only and are not intended as limitations.

The example timing optimizations described within this disclosure may be performed on a circuit design that is to be implemented within a target IC having an architecture the same as or similar to that illustrated in FIG. 7. A system as described herein in connection with FIG. 1 is capable of processing a circuit design by performing the various operations described herein and generating a configuration bitstream or other representation of the circuit design that may be used to physically implement the circuit design within the target IC. The embodiments described herein may also be applied to circuit designs that are implemented within other types of ICs such as Application-Specific ICs (ASICs).

For purposes of explanation, specific nomenclature is set forth to provide a thorough understanding of the various inventive concepts disclosed herein. The terminology used herein, however, is for the purpose of describing particular aspects of the inventive arrangements only and is not intended to be limiting.

As defined herein, the singular forms "a," "an," and "the" are intended to include the plural forms as well, unless the context clearly indicates otherwise.

As defined herein, the term "approximately" means nearly correct or exact, close in value or amount but not precise. For example, the term "approximately" may mean that the recited characteristic, parameter, or value is within a predetermined amount of the exact characteristic, parameter, or value.

As defined herein, the terms "at least one," "one or more," and "and/or," are open-ended expressions that are both conjunctive and disjunctive in operation unless explicitly stated otherwise. For example, each of the expressions "at least one of A, B, and C," "at least one of A, B, or C," "one or more of A, B, and C," "one or more of A, B, or C," "A, B, and/or C" means A alone, B alone, C alone, A and B together, A and C together, B and C together, or A, B and C together.

As defined herein, the term "automatically" means without user intervention. As defined herein, the term "user" means a human being.

As defined herein, the term "computer readable storage medium" means a storage medium that contains or stores program code for use by or in connection with an instruction execution system, apparatus, or device. As defined herein, a "computer readable storage medium" is not a transitory, propagating signal per se. A computer readable storage medium may be, but is not limited to, an electronic storage device, a magnetic storage device, an optical storage device, an electromagnetic storage device, a semiconductor storage device, or any suitable combination of the foregoing. The various forms of memory, as described herein, are examples of computer readable storage media. A non-exhaustive list of more specific examples of a computer readable storage medium may include: a portable computer diskette, a hard disk, a RAM, a read-only memory (ROM), an erasable programmable read-only memory (EPROM or Flash memory), an electronically erasable programmable read-only memory (EEPROM), a static random access memory (SRAM), a portable compact disc read-only memory (CD-ROM), a digital versatile disk (DVD), a memory stick, a floppy disk, or the like.

As defined herein, the term "if" means "when" or "upon" or "in response to" or "responsive to," depending upon the context. Thus, the phrase "if it is determined" or "if [a stated condition or event] is detected" may be construed to mean "upon determining" or "in response to determining" or "upon detecting [the stated condition or event]" or "in response to detecting [the stated condition or event]" or "responsive to detecting [the stated condition or event]" depending on the context.

As defined herein, the term "responsive to" and similar language as described above, e.g., "if," "when," or "upon," means responding or reacting readily to an action or event. The response or reaction is performed automatically. Thus, if a second action is performed "responsive to" a first action, there is a causal relationship between an occurrence of the first action and an occurrence of the second action. The term "responsive to" indicates the causal relationship.

As defined herein, the terms "one embodiment," "an embodiment," "one or more embodiments," "particular embodiments," or similar language mean that a particular feature, structure, or characteristic described in connection with the embodiment is included in at least one embodiment described within this disclosure. Thus, appearances of the phrases "in one embodiment," "in an embodiment," "in one or more embodiments," "in particular embodiments," and similar language throughout this disclosure may, but do not necessarily, all refer to the same embodiment. The terms "embodiment" and "arrangement" are used interchangeably within this disclosure.

As defined herein, the term "processor" means at least one hardware circuit. The hardware circuit may be configured to carry out instructions contained in program code. The hardware circuit may be an integrated circuit. Examples of a processor include, but are not limited to, a central processing unit (CPU), an array processor, a vector processor, a digital signal processor (DSP), an FPGA, a programmable logic array (PLA), an ASIC, programmable logic circuitry, and a controller.

As defined herein, the term "output" means storing in physical memory elements, e.g., devices, writing to display or other peripheral output device, sending or transmitting to another system, exporting, or the like.

As defined herein, the term "real time" means a level of processing responsiveness that a user or system senses as sufficiently immediate for a particular process or determination to be made, or that enables the processor to keep up with some external process.

As defined herein, the term "substantially" means that the recited characteristic, parameter, or value need not be achieved exactly, but that deviations or variations, including for example, tolerances, measurement error, measurement accuracy limitations, and other factors known to those of skill in the art, may occur in amounts that do not preclude the effect the characteristic was intended to provide.

The terms first, second, etc. may be used herein to describe various elements. These elements should not be limited by these terms, as these terms are only used to distinguish one element from another unless stated otherwise or the context clearly indicates otherwise.

A computer program product may include a computer readable storage medium (or media) having computer readable program instructions thereon for causing a processor to carry out aspects of the inventive arrangements described herein. Within this disclosure, the term "program code" is used interchangeably with the term "computer readable program instructions." Computer readable program instructions described herein may be downloaded to respective computing/processing devices from a computer readable storage medium or to an external computer or external storage device via a network, for example, the Internet, a LAN, a WAN and/or a wireless network. The network may include copper transmission cables, optical transmission fibers, wireless transmission, routers, firewalls, switches, gateway computers and/or edge devices including edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations for the inventive arrangements described herein may be assembler instructions, instruction-set-architecture (ISA) instructions, machine instructions, machine dependent instructions, microcode, firmware instructions, or either source code or object code written in any combination of one or more programming languages, including an object oriented programming language and/or procedural programming languages. Computer readable program instructions may include state-setting data. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a LAN or a WAN, or the connection may be made to an external computer (for example, through the Internet using an Internet Service Provider). In some cases, electronic circuitry including, for example, programmable logic circuitry, an FPGA, or a PLA may execute the computer readable program instructions by utilizing state information of the computer readable program instructions to personalize the electronic circuitry, in order to perform aspects of the inventive arrangements described herein.

Certain aspects of the inventive arrangements are described herein with reference to flowchart illustrations and/or block diagrams of methods, apparatus (systems), and computer program products. It will be understood that each block of the flowchart illustrations and/or block diagrams, and combinations of blocks in the flowchart illustrations and/or block diagrams, may be implemented by computer readable program instructions, e.g., program code.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the operations specified in the flowchart and/or block diagram block or blocks.

The computer readable program instructions may also be loaded onto a computer, other programmable data processing apparatus, or other device to cause a series of operations to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various aspects of the inventive arrangements. In this regard, each block in the flowchart or block diagrams may represent a module, segment, or portion of instructions, which comprises one or more executable instructions for implementing the specified operations.

In some alternative implementations, the operations noted in the blocks may occur out of the order noted in the figures. For example, two blocks shown in succession may be executed substantially concurrently, or the blocks may sometimes be executed in the reverse order, depending upon the functionality involved. In other examples, blocks may be performed generally in increasing numeric order while in still other examples, one or more blocks may be performed in varying order with the results being stored and utilized in subsequent or other blocks that do not immediately follow. It will also be noted that each block of the block diagrams and/or flowchart illustration, and combinations of blocks in the block diagrams and/or flowchart illustration, may be implemented by special purpose hardware-based systems that perform the specified functions or acts or carry out combinations of special purpose hardware and computer instructions.

The corresponding structures, materials, acts, and equivalents of all means or step plus function elements that may be found in the claims below are intended to include any structure, material, or act for performing the function in combination with other claimed elements as specifically claimed.

In one or more embodiments, a method includes detecting, using computer hardware, a net of the circuit design with a hold timing violation, generating, using the computer hardware, a list including each load of the net, and filtering, using the computer hardware, the list based on predetermined criteria by, at least in part, removing each load from the list determined to be non-critical with respect to hold timing. The method may include modifying, using the computer hardware, the circuit design by inserting a flip-flop in the net to drive each load remaining on the list, clocking the flip-flop with a clock signal of a start point or an end point of a path traversing the net, and triggering the flip-flop with an opposite clock edge compared to the start point or the end point.

In an aspect, the clock signal used to clock the inserted flip-flop is the clock signal having a higher frequency.

In another aspect, the filtering may include removing each load from the list that is not triggered by a same clock edge as the start point or that has an output cone including a sequential circuit element that is not triggered by the same clock edge as the start point.

In another aspect, the filtering may include removing each load from the list that is asynchronous with the start point.

In another aspect, the filtering may include removing each load from the list when neither a period of a clock associated with the load is a multiple of a period of the clock of the start point, nor the period of the clock of the start point is a multiple of the period of the clock associated with the load.

In another aspect, the filtering may include removing each load from the list that is associated with a clock signal having a phase shift relative to the clock signal of the start point.

In another aspect, the filtering may include distinguishing among critical loads and non-critical loads of the net based on hold slack of each load.

In another aspect, the filtering may include removing each load from the list that has insufficient setup slack.

In another aspect, where a plurality of nets of the circuit design have hold timing violations, the method may include selecting the net from the plurality of nets based on negative hold slack.

In another aspect, where the net has a plurality of loads, the modifying may include grouping the remaining loads on the list based on clock frequency associated with each load and inserting a flip-flop for each group of loads.

In one or more embodiments, a system includes a memory configured to store program code and a processor coupled to the memory. The processor, in response to executing the program code, is configured to initiate operations. The operations include detecting a net of the circuit design with a hold timing violation, generating a list including each load of the net, and filtering the list based on predetermined criteria by, at least in part, removing each load from the list determined to be non-critical with respect to hold timing. The operations may also include modifying the circuit design by inserting a flip-flop in the net to drive each load remaining on the list, clocking the flip-flop with a clock signal of a start point or an end point of a path traversing the net, and triggering the flip-flop with an opposite clock edge compared to the start point or the end point.

In an aspect, the clock signal used to clock the inserted flip-flop is the clock signal having a higher frequency.

In another aspect, the filtering may include removing each load from the list that is not triggered by a same clock edge as the start point or that has an output cone including a sequential circuit element that is not triggered by the same clock edge as the start point.

In another aspect, the filtering may include removing each load from the list that is asynchronous with the start point.

In another aspect, the filtering may include removing each load from the list when neither a period of a clock associated with the load is a multiple of a period of the clock of the start point, nor the period of the clock of the start point is a multiple of the period of the clock associated with the load.

In another aspect, the filtering may include removing each load from the list that is associated with a clock signal having a phase shift relative to the clock signal of the start point.

In another aspect, the filtering may include distinguishing among critical loads and non-critical loads of the net based on hold slack of each load.

In another aspect, where a plurality of nets of the circuit design have hold timing violations, the operations may include selecting the net from the plurality of nets based on negative hold slack.

In another aspect, the filtering may include removing each load from the list that has insufficient setup slack.

In another aspect, where the net has a plurality of loads, the modifying may include grouping the remaining loads on the list based on clock frequency associated with each load and inserting a flip-flop for each group of loads.

In one or more embodiments, a computer program product includes a computer readable storage medium having program code stored thereon. The program code is executable by a processor to initiate operations. The operations can include detecting a net of the circuit design with a hold timing violation, generating a list including each load of the net, and filtering the list based on predetermined criteria by, at least in part, removing each load from the list determined to be non-critical with respect to hold timing. The operations may also include modifying the circuit design by inserting a flip-flop in the net to drive each load remaining on the list, clocking the flip-flop with a clock signal of a start point or an end point of a path traversing the net, and triggering the flip-flop with an opposite clock edge compared to the start point or the end point.

In an aspect, the clock signal used to clock the inserted flip-flop is the clock signal having a higher frequency.

In another aspect, the filtering may include removing each load from the list that is not triggered by a same clock edge as the start point or that has an output cone including a sequential circuit element that is not triggered by the same clock edge as the start point.

In another aspect, the filtering may include removing each load from the list that is asynchronous with the start point.

In another aspect, the filtering may include removing each load from the list when neither a period of a clock associated with the load is a multiple of a period of the clock of the start point, nor the period of the clock of the start point is a multiple of the period of the clock associated with the load.

In another aspect, the filtering may include removing each load from the list that is associated with a clock signal having a phase shift relative to the clock signal of the start point.

In another aspect, the filtering may include distinguishing among critical loads and non-critical loads of the net based on hold slack of each load.

In another aspect, where a plurality of nets of the circuit design have hold timing violations, the operations may include selecting the net from the plurality of nets based on negative hold slack.

In another aspect, the filtering may include removing each load from the list that has insufficient setup slack.

In another aspect, where the net has a plurality of loads, the modifying may include grouping the remaining loads on the list based on clock frequency associated with each load and inserting a flip-flop for each group of loads.

The description of the inventive arrangements provided herein is for purposes of illustration and is not intended to be exhaustive or limited to the form and examples disclosed. The terminology used herein was chosen to explain the principles of the inventive arrangements, the practical application or technical improvement over technologies found in the marketplace, and/or to enable others of ordinary skill in the art to understand the inventive arrangements disclosed herein. Modifications and variations may be apparent to those of ordinary skill in the art without departing from the scope and spirit of the described inventive arrangements. Accordingly, reference should be made to the following claims, rather than to the foregoing disclosure, as indicating the scope of such features and implementations.

What is claimed is:

1. A method for implementing a circuit design, the method comprising:
   detecting, using computer hardware, a net of the circuit design with a hold timing violation;
   generating, using the computer hardware, a list including each load of the net;
   filtering, using the computer hardware, the list based on predetermined criteria by, at least in part, removing each load from the list determined to be non-critical with respect to hold timing; and modifying, using the computer hardware, the circuit design by inserting a flip-flop in the net to drive each load remaining on the list, clocking the flip-flop with a clock signal of a start point or an end point of a path traversing the net, and triggering the flip-flop with an opposite clock edge compared to the start point or the end point;

wherein the clock signal used to clock the inserted flip-flop is the clock signal having a higher frequency from among the clock signal of the start point and the clock signal of the end point.

2. The method of claim 1, wherein the detecting, generating, filtering, and modifying is performed between place and route of the circuit design.

3. The method of claim 1, wherein the filtering comprises:
removing each load from the list that is not triggered by a same clock edge as the start point or that has an output cone including a sequential circuit element that is not triggered by the same clock edge as the start point.

4. The method of claim 1, wherein the filtering comprises:
removing each load from the list that is asynchronous with the start point.

5. The method of claim 1, wherein the filtering comprises:
removing each load from the list when neither a period of a clock associated with the load is a multiple of a period of the clock of the start point, nor the period of the clock of the start point is a multiple of the period of the clock associated with the load.

6. The method of claim 1, wherein the filtering comprises:
removing each load from the list that is associated with a clock signal having a phase shift relative to the clock signal of the start point.

7. The method of claim 1, wherein the filtering comprises:
distinguishing among critical loads and non-critical loads of the net based on hold slack of each load.

8. The method of claim 1, wherein the filtering comprises:
removing each load from the list that has a setup slack not exceeding a threshold setup slack.

9. The method of claim 1, wherein the net has a plurality of loads, wherein the modifying comprises:
grouping the remaining loads on the list based on clock frequency associated with each load; and
inserting a flip-flop for each group of loads.

10. A system for implementing a circuit design, comprising:
a memory configured to store program code; and
a processor coupled to the memory, wherein the processor, in response to executing the program code, is configured to initiate operations including:
detecting a net of the circuit design with a hold timing violation;
generating a list including each load of the net;
filtering the list based on predetermined criteria by, at least in part, removing each load from the list determined to be non-critical with respect to hold timing; and
modifying the circuit design by inserting a flip-flop in the net to drive each load remaining on the list, clocking the flip-flop with a clock signal of a start point or an end point of a path traversing the net, and triggering the flip-flop with an opposite clock edge compared to the start point or the end point;

wherein the clock signal used to clock the inserted flip-flop is the clock signal having a higher frequency from among the clock signal of the start point and the clock signal of the end point.

11. The system of claim 10, wherein the detecting, generating, filtering, and modifying is performed between place and route of the circuit design.

12. The system of claim 10, wherein the filtering comprises:
removing each load from the list that is not triggered by a same clock edge as the start point or that has an output cone including a sequential circuit element that is not triggered by the same clock edge as the start point.

13. The system of claim 10, wherein the filtering comprises:
removing each load from the list that is asynchronous with the start point.

14. The system of claim 10, wherein the filtering comprises:
removing each load from the list when neither a period of a clock associated with the load is a multiple of a period of the clock of the start point, nor the period of the clock of the start point is a multiple of the period of the clock associated with the load.

15. The system of claim 10, wherein the filtering comprises:
removing each load from the list that is associated with a clock signal having a phase shift relative to the clock signal of the start point.

16. The system of claim 10, wherein the filtering comprises:
distinguishing among critical loads and non-critical loads of the net based on hold slack of each load.

17. The system of claim 10, wherein the filtering comprises:
removing each load from the list that has a setup slack not exceeding a threshold setup slack.

18. The system of claim 10, wherein the net has a plurality of loads, wherein the modifying comprises:
grouping the remaining loads on the list based on clock frequency associated with each load; and
inserting a flip-flop for each group of loads.

19. A computer program product for implementing a circuit design, comprising:
a computer readable storage medium having program code stored thereon, wherein the program code is executable by computer hardware to initiate operations including:
detecting a net of the circuit design with a hold timing violation;
generating a list including each load of the net;
filtering the list based on predetermined criteria by, at least in part, removing each load from the list determined to be non-critical with respect to hold timing; and
modifying the circuit design by inserting a flip-flop in the net to drive each load remaining on the list, clocking the flip-flop with a clock signal of a start point or an end point of a path traversing the net, and triggering the flip-flop with an opposite clock edge compared to the start point or the end point;

wherein the clock signal used to clock the inserted flip-flop is the clock signal having a higher frequency from among the clock signal of the start point and the clock signal of the end point.

20. The computer program product of claim 19, wherein the filtering comprises:

distinguishing among critical loads and non-critical loads of the net based on hold slack of each load.

* * * * *